(12) United States Patent
Sprenger et al.

(10) Patent No.: US 6,484,969 B2
(45) Date of Patent: Nov. 26, 2002

(54) LOWERABLE BAGGAGE COMPARTMENT FOR A PASSENGER CABIN

(75) Inventors: Wilfried Sprenger, Issendorf; Bernd Roessner, Rosengarten, both of (DE)

(73) Assignee: Airbus Deutschland GmbH, Hamburg (DE)

(*) Notice: Subject to any disclaimer, the term of this patent is extended or adjusted under 35 U.S.C. 154(b) by 0 days.

(21) Appl. No.: 09/765,504

(22) Filed: Jan. 16, 2001

(65) Prior Publication Data

US 2001/0011692 A1 Aug. 9, 2001

(30) Foreign Application Priority Data

Jan. 13, 2000 (DE) .......................................... 100 01 038

(51) Int. Cl.[7] .............................................. B64D 11/00
(52) U.S. Cl. .................................. 244/118.5; 244/118.1
(58) Field of Search ............................. 244/118.1, 118.5

(56) References Cited

U.S. PATENT DOCUMENTS

| | | | | |
|---|---|---|---|---|
| 2,676,333 A | * | 4/1954 | Patton et al. | |
| 3,729,245 A | * | 4/1973 | Skifstrom | |
| 4,076,351 A | * | 2/1978 | Wyant | |
| 4,275,942 A | * | 6/1981 | Steidl | |
| 4,368,937 A | * | 1/1983 | Plombo et al. | |
| 4,403,760 A | * | 9/1983 | Alvermann | |
| 5,244,269 A | | 9/1993 | Harriehausen et al. | |
| 5,249,858 A | * | 10/1993 | Nusser | |
| 5,383,628 A | | 1/1995 | Harriehausen et al. | |
| 5,441,218 A | | 8/1995 | Mueller et al. | |
| 5,456,529 A | * | 10/1995 | Cheung | |
| 5,567,028 A | * | 10/1996 | Lutovsky et al. | |
| 5,590,851 A | * | 1/1997 | Ackerman | 244/118.5 |
| 5,820,076 A | | 10/1998 | Schumacher et al. | |
| 5,839,694 A | | 11/1998 | Bargull et al. | |
| 5,934,615 A | * | 8/1999 | Treichler et al. | 244/118.5 |
| 6,045,204 A | * | 4/2000 | Frazier et al. | 244/118.5 |

FOREIGN PATENT DOCUMENTS

| | | |
|---|---|---|
| DE | 19546302 | 6/1997 |
| DE | 19800588 | 7/1999 |

\* cited by examiner

Primary Examiner—Charles T. Jordan
Assistant Examiner—Lulit Semunegus
(74) Attorney, Agent, or Firm—W. F. Fasse; W. G. Fasse

(57) ABSTRACT

A baggage storage system especially for an aircraft passenger cabin includes a lowerable baggage compartment, a guide arrangement along which the motion of the baggage compartment is guided between an upper closed position and a lower open position, a powered drive unit, and a coupling arrangement that selectively couples or decouples the drive unit relative to the baggage compartment. With the drive unit coupled to the baggage compartment, a full powered raising and lowering of the baggage compartment is achieved. If the drive unit fails, it is decoupled from the baggage compartment, so that the baggage compartment can be manually raised and lowered. A locking latch arrangement securely latches the baggage compartment in the upper closed position.

17 Claims, 4 Drawing Sheets

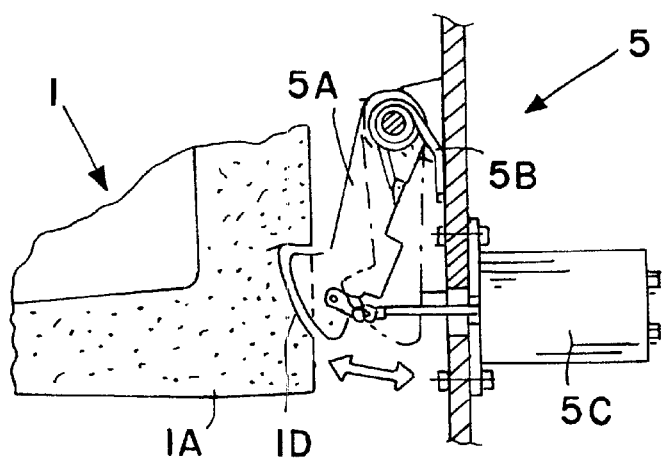
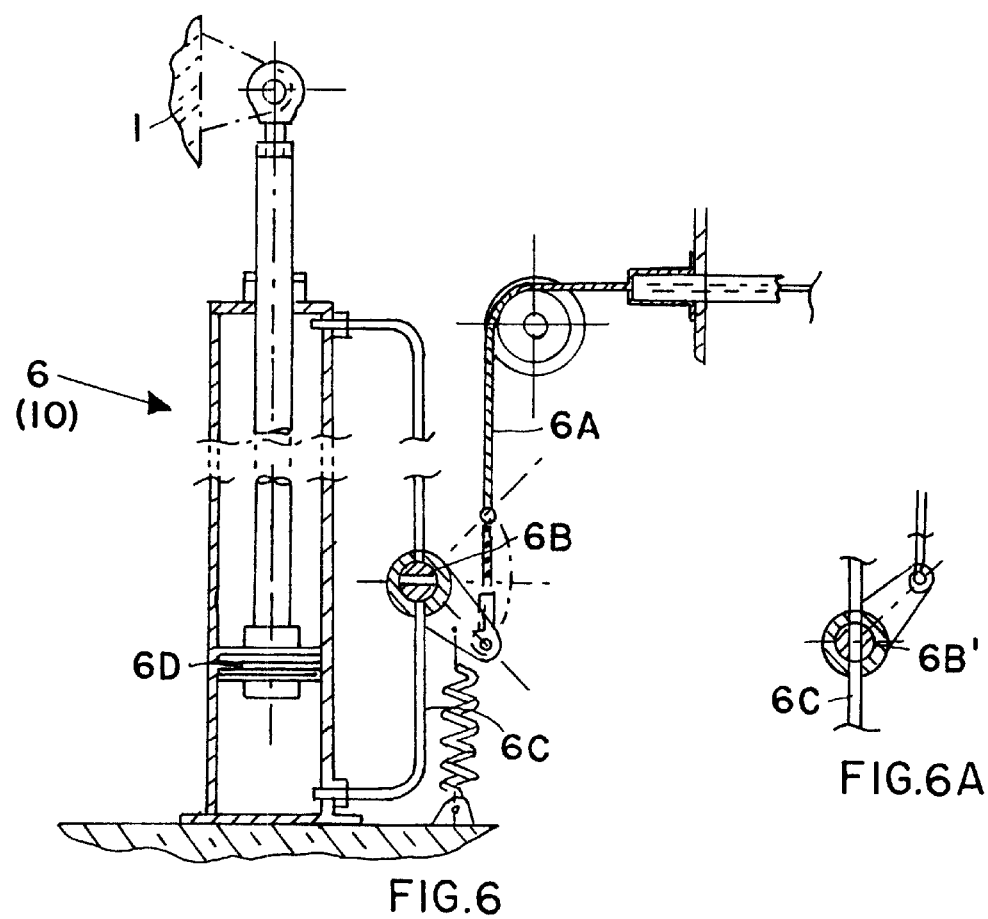

LOWERABLE BAGGAGE COMPARTMENT FOR A PASSENGER CABIN

This application is based on and claims the priority under 35 U.S.C. §119 of German Patent Application 100 01 038.5, filed on Jan. 13, 2000, the entire disclosure of which is incorporated herein by reference.

FIELD OF THE INVENTION

The invention relates to a baggage storage system with a lowerable or drop-down baggage compartment for a passenger cabin, especially in an aircraft. The baggage compartment is selectively movable from an upper closed position to a lower open loading position, and vice versa.

BACKGROUND INFORMATION

It is generally known to use so-called overhead baggage compartments in passenger cabins of commercial transport aircraft, whereby the baggage compartments may be lowered from an upper closed position to a lower open loading position, and vice versa.

A guidance and support system guides the motion of the baggage compartment between the two open and closed positions, whereby many different embodiments or configurations of such a guide system are known in the prior art. For example, German Patent Laying-Open Document 195 46 302 discloses a known four-joint or four-link system, and German Patent Laying-Open Document 198 00 588 discloses a known linear guide system for guiding the motion of such a lowerable baggage compartment.

Such guide systems can be equipped with drive units to apply a supporting force that assists in the manual lifting and closing of a loaded baggage compartment. Typical embodiments for providing such a supporting force use tension springs or gas-charged piston/cylinder devices. Alternatively, the drive unit can be embodied as an active motor drive that entirely carries out the lowering and raising of the baggage compartment without any manual operating force being applied to the baggage compartment. The use of such a lifting and lowering drive for the baggage compartment is very comfortable and pleasant for the passengers and flight attendants in the aircraft, because they do not need to apply any manual operating force for raising or lowering the baggage compartment. Problems arise, however, if the drive unit for the baggage compartment fails.

In prior art arrangements, it becomes very difficult or even impossible to manually open or close the baggage compartment if the drive unit thereof has failed. For safety reasons, however, it is necessary that the baggage compartment can be closed and securely latched in the closed position at all times during a flight, even if the drive unit of the baggage compartment has failed. On the other hand, passengers strongly desire to have continuous access to their carry-on baggage, which means that the baggage compartment must remain openable and thereby accessible even in the case of the failure of the raising and lowering drive unit.

SUMMARY OF THE INVENTION

In view of the above, it is an object of the invention to provide a lowerable baggage compartment that remains accessible as well as securely closeable at all times, even in the event of a failure of a motor drive unit thereof. The invention particularly aims to provide such a baggage compartment that can be readily manually opened and securely closed in the event of a failure of the motor drive unit. The invention further aims to avoid or overcome the disadvantages of the prior art, and to achieve additional advantages, as apparent from the present specification.

The above objects have been achieved according to the invention in a baggage storage system including a lowerable baggage compartment, a guide system along which the baggage compartment can be moved between an upper closed position and a lower open position, a drive unit, and a coupling unit that selectively couples the baggage compartment to and selectively decouples the baggage compartment from drive power of the drive unit. Namely, when the drive unit is properly operational, it is coupled to the baggage compartment so as to selectively raise and lower the baggage compartment in a guided manner along the guide system. On the other hand, in the event of the failure of the drive unit, the coupling unit decouples the drive unit from the baggage compartment, so that the baggage compartment can be manually operated without hindrance by the failed drive unit. The invention thus provides a baggage compartment that is entirely motor driven under normal operating circumstances, but that further has an emergency operating function which enables the baggage compartment to be manually opened and securely closed, and allows easy access to the carry-on baggage stowed in the baggage compartment, in the event of a failure of the motor drive unit.

According to embodiment details of the invention, the baggage compartment system may further include a locking latch arrangement with a latch pawl that is preferably spring-loaded to selectively engage a detent recess or pocket in the baggage compartment when the baggage compartment is in the closed position. Thereby, the baggage compartment can be securely fixed or locked in the upper closed position, independently of the functionality of the drive unit. In other words, the drive unit itself is not relied on for holding the baggage compartment in the upper closed position. This inventive feature satisfies safety requirements that particularly exist in commercial passenger transport aircraft.

According to further features of the invention, the drive unit may comprise a toothed belt or gear belt driven by a corresponding drive gear wheel or toothed pulley on a drive shaft, which may be selectively coupled to or decoupled from a drive motor by a mechanical coupling. Alternatively, the drive unit may be a pivot drive including a splined shaft arranged on or about the pivot axis, with a mechanical coupling that may be switched between coupled and decoupled states by means of a shifting claw or dog, so as to couple or decouple the drive. The shifting claw may be manually operable via a tension cable and a manually operable hand lever. Alternatively, the shifting claw may be operated by electrical, electromagnetic, pneumatic or hydraulic actuator devices.

According to further embodiments, the drive unit may comprise a fluid stroke drive including a hydraulic or pneumatic working cylinder cooperating with a working piston that drives the opening and closing motion of the baggage compartment. In this embodiment, a bypass line and a bypass valve form the coupling unit. The bypass valve and thereby the bypass line can be opened so that the hydraulic or pneumatic working fluid bypasses the hydraulic or pneumatic working cylinder.

Alternatively, the drive unit may be a spindle stroke drive including a threaded drive spindle, a transmission, and a drive motor connected by the transmission to the spindle, as well as a slide carriage connected to the baggage compartment. The spindle is selectively coupled to or decoupled from the carriage, to selectively drive the baggage compartment between the open and closed positions, or to selectively allow the baggage compartment to be manually operated without hindrance by the drive unit.

BRIEF DESCRIPTION OF THE DRAWINGS

In order that the invention may be clearly understood, it will now be described in connection with example embodiments, with reference to the accompanying drawings, wherein:

FIG. 3 is an enlarged detail sectional view of the locking latch arrangement for the lowerable baggage compartment;

FIG. 6 is a schematic sectional view of a third embodiment of a drive unit for operating a lowerable baggage compartment according to the invention;

FIG. 6A shows a portion of the arrangement of FIG. 6 in an alternative operating position, namely with the bypass valve open.

DETAILED DESCRIPTION OF PREFERRED EXAMPLE EMBODIMENTS AND OF THE BEST MODE OF THE INVENTION

Figure 1:
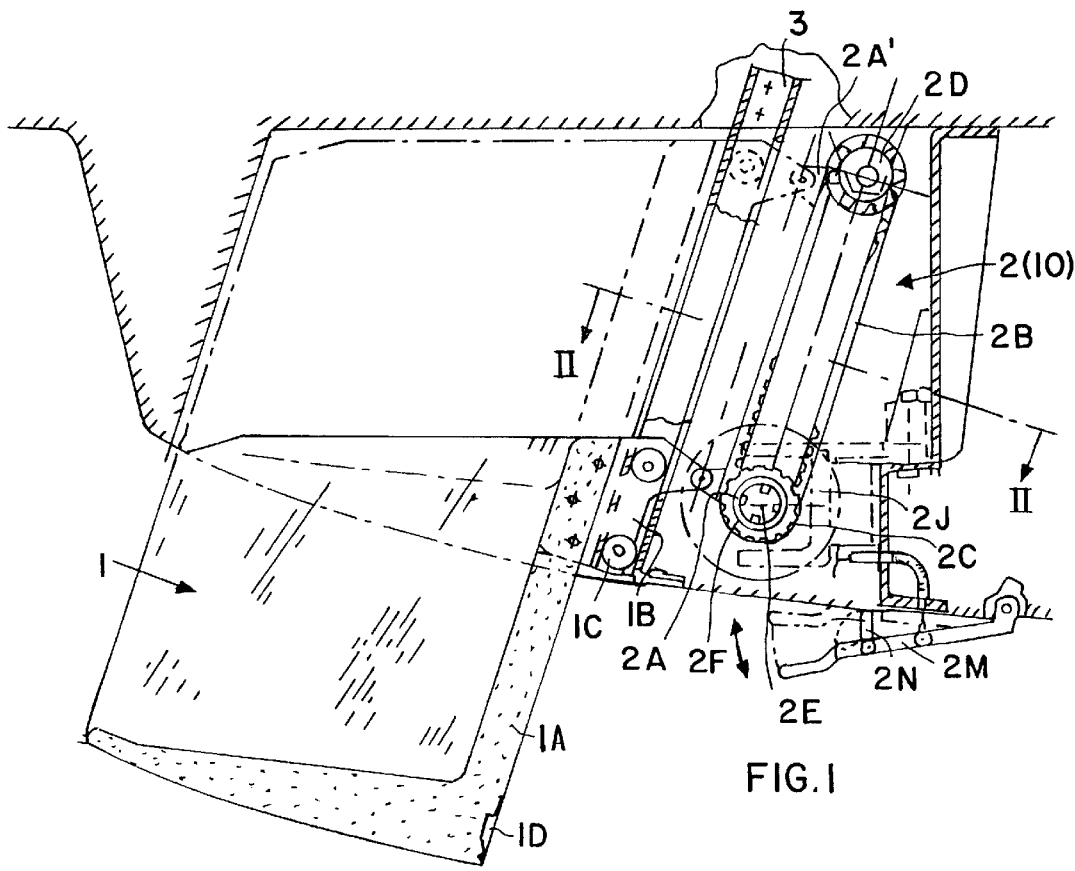
FIG. 1 is a schematic sectional view of a first embodiment of a baggage storage system according to the invention, with a gear belt drive for a lowerable baggage compartment.
Figure 2:
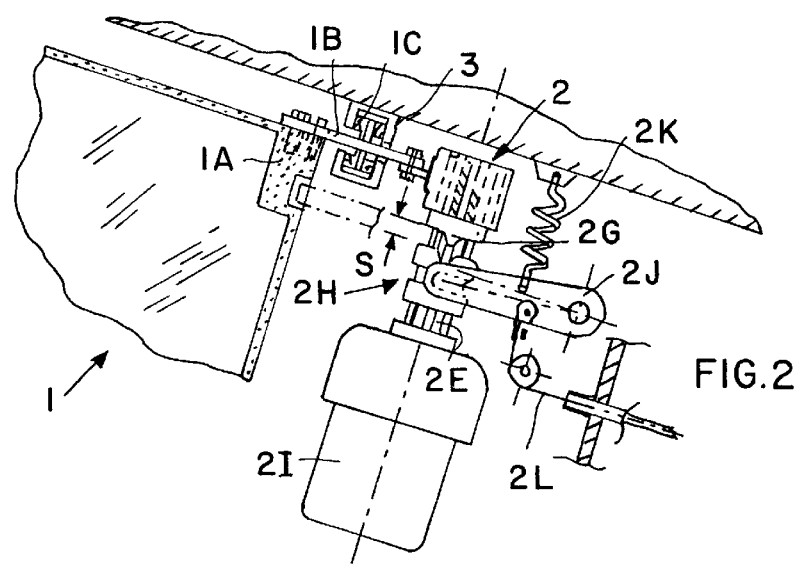
FIG. 2 is a sectional view of a detail portion of the arrangement of FIG. 1 as seen along the section line II—II.

FIGS. 1 and 2 show a first embodiment of a baggage storage system according to the invention, in which a lowerable baggage compartment 1 is driven between an upper closed position and a lower open position by a toothed belt or gear belt drive 2, as the baggage compartment 1 moves linearly along guide rails 3. The gear belt drive 2 thus, in general, represents the drive unit 10 that is selectively connected to the baggage compartment 1 for raising and lowering the baggage compartment 1. The drive unit 10 can be actuated for selectively opening or closing the baggage compartment by means of operating switches (not shown) which appropriately cintrol the drive motor 2I as will be discussed below.

In greater detail, lateral carrying arms or support arms 1A extend along the sides of the baggage compartment 1 to carry the baggage compartment. Brackets 1B are secured to and protrude from the carrying arms 1A, and running rollers 1C are rotatably mounted on the brackets 1B, in such a manner that the running rollers 1C can roll along the guide rails 3. A rearward protrusion, facing away from the baggage compartment 1, of at least one of the brackets 1B is connected to a drive dog or follower 2A of the gear belt drive 2. In FIG. 1, the open position of the baggage compartment 1 is shown in solid lines, and the upper closed position thereof is shown in dash-dotted lines, in which the drive follower 2A is in the position 2A'.

In addition to the drive follower 2A, the gear belt drive 2 further comprises a gear belt 2B arranged to run around a drive gear wheel or toothed pulley 2C and an idler gear wheel or pulley 2D. The follower 2A is connected to the belt 2B. The drive wheel 2C is arranged freely rotatably on a splined shaft 2E, for example being supported on a slide bearing 2F relative to the splined shaft 2E. Furthermore, at least one follower tooth or cog 2G is provided on the drive wheel 2C, and a clutch or coupling 2H is slidably arranged on the splined shaft 2E to selectively engage the at least one follower cog 2G. In this context, of course, the tooth or teeth and the groove or grooves (i.e. splines) can be exchanged or reversed with one another.

In the above arrangement, the coupling 2H is selectively movable between a coupled position (not shown) and a de-coupled position (shown in FIG. 2) with respect to the drive wheel 2C. In the coupled position, the at least one follower cog 2G couples the coupling 2H to the belt drive wheel 2C, and thereby transmits the drive power of a drive motor 2I through the splined shaft 2E, the coupling 2H, the at least one follower cog 2G, and the belt drive wheel 2C to the toothed gear belt 2B. In this condition, the drive motor 2I can be operated by selecting the appropriate operating switch, as mentioned above, to selectively raise or lower the baggage compartment 1 along the guide rails 3. Preferably, when the baggage compartment 1 reaches its respective upper or lower positions, respective end limit switches will automatically switch off the gear belt drive 2.

When the baggage compartment 1 is in its upper position, a locking latch arrangement 5, shown in FIG. 3, is engaged to securely latch the baggage compartment 1 in this upper position. Particularly, a latch pawl 5A that is spring-biased by a spring such as a torsion coil spring 5B engages a detent recess or pocket 1D in the baggage compartment 1 or particularly the carrying arm 1A thereof. In order to lower the baggage compartment 1, the latch pawl 5A is disengaged from the detent recess 1D by actuating a pawl operating device such as a stroke magnet (e.g. magnetic solenoid) 5C that is connected to the latch pawl 5A to actively oppose and overcome the spring bias of the spring 5B. The stroke magnet 5C may instead be replaced by any known linear actuator or a manually pulled tension cable or the like. In the normal operation of the baggage storage system, switching on the gear belt drive 2 to lower the baggage compartment 1 will automatically and simultaneously operate the stroke magnet 5C to disengage the locking latch arrangement 5, so that the baggage compartment 1 may be lowered by the positive operation of the gear belt drive 2.

In the event that the gear belt drive 2 fails, it is possible to open or decouple the coupling 2H to disconnect the non-operable drive from the baggage compartment 1, so that the baggage compartment 1 may be opened and closed manually, i.e. applying a manual opening or closing force to the baggage compartment 1, in an emergency or failure functioning mode. The de-coupled condition of the coupling 2H is shown in FIG. 2. The coupling 2H is shifted by means of a shifting claw or dog 2J which is constantly urged into the coupled condition by a tension spring 2K. The arrows S illustrate the coupling stroke of the coupling 2H. In order to decouple the coupling 2H, a tension cable 2L or the like is pulled by manually operating a hand lever 2M. Alternatively, or additionally, any other type of tension actuator, such as an electrical actuator, can be used to pull the tension cable 2L so as to move the shifting claw 2J against the biasing force of the tension spring 2K. A small retaining pawl 2N or the like ensures that the coupling 2H will be maintained in the decoupled position.

With the above described arrangement, and in this manner, it is now possible to manually operate the baggage compartment 1 in the event of a failure of the gear belt drive 2. If the baggage compartment 1 is in the upper closed position and is to be opened, then first the hand lever 2M is pulled so as to decouple the gear belt drive 2 via the tension cable 2L and the coupling 2H. Simultaneously or thereafter, the appropriate operating switch is depressed, in order to activate the stroke magnet 5C shown in FIG. 3, so as to retract the latch pawl 5A out of the detent recess 1D. At this point, the baggage compartment 1 may be manually lowered. If the baggage compartment 1 is heavily loaded with baggage, it will move downward under its own load weight. Advantageously and preferably, a damper arrangement such as a gas-charged cylinder or the like is connected to the baggage compartment 1 so as to damp and slow the downward motion of the baggage compartment 1.

On the other hand, if the gear belt drive 2 fails when the baggage compartment 1 is in the lower position, then the compartment 1 may be manually lifted and closed as follows. First, the hand lever 2M is pulled to de-couple the drive, and then the baggage compartment 1 can be manually lifted or pushed upward into its upper position. A counter spring can assist the manual lifting force needed for manually lifting the baggage compartment 1. Once the baggage compartment 1 reaches its upper position, the latch pawl 5A automatically engages into the detent recess 1D under its spring bias, and thereby the baggage compartment 1 is securely fixed in its upper position. In this manner, the inventive drive arrangement 10 with a selective coupling 2H ensures that the baggage compartment 1 remains fully useable by manually opening and closing the baggage compartment 1, in the event of a failure of the power actuated drive 10.

Figure 4:
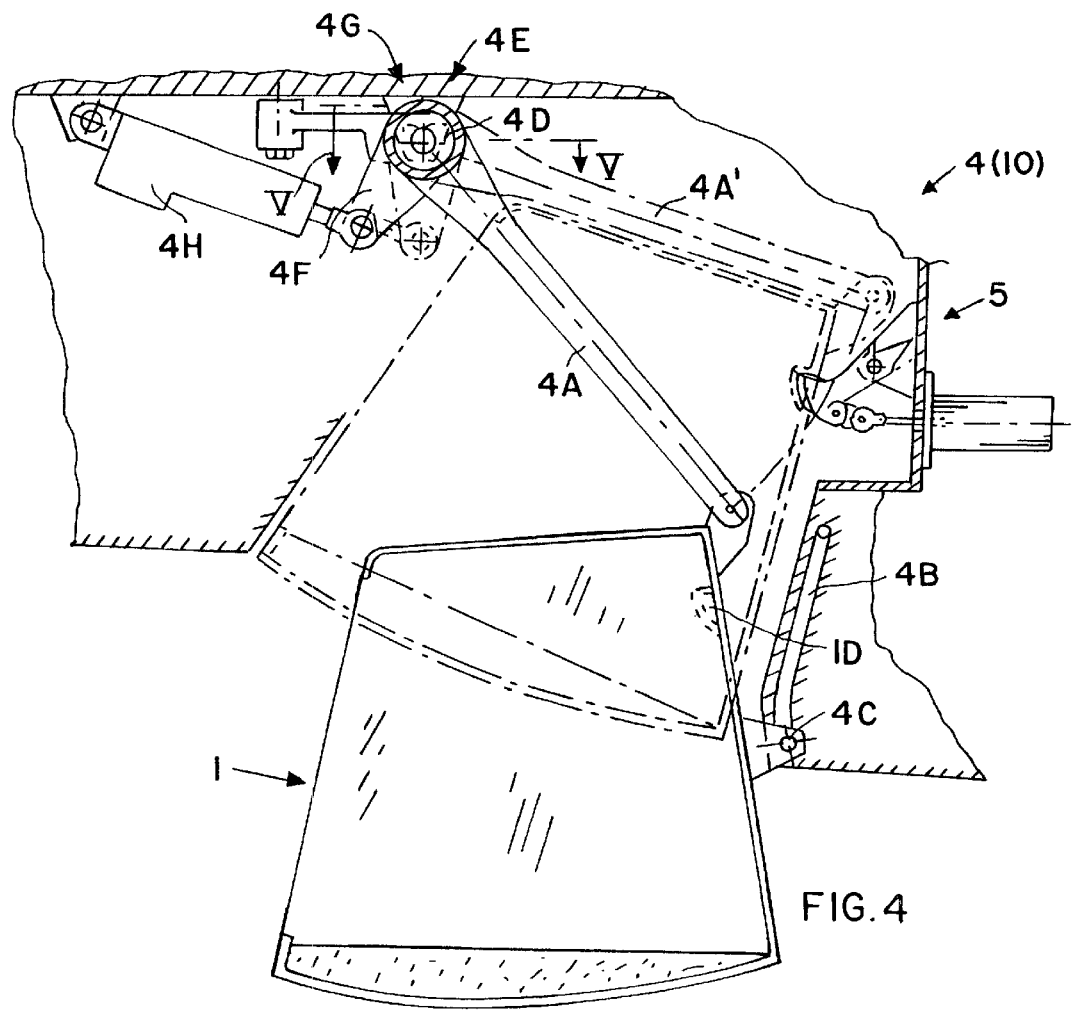
FIG. 4 is a schematic sectional view of a second embodiment of an inventive baggage storage system including a pivot drive that operates the lowerable baggage compartment.
Figure 5:
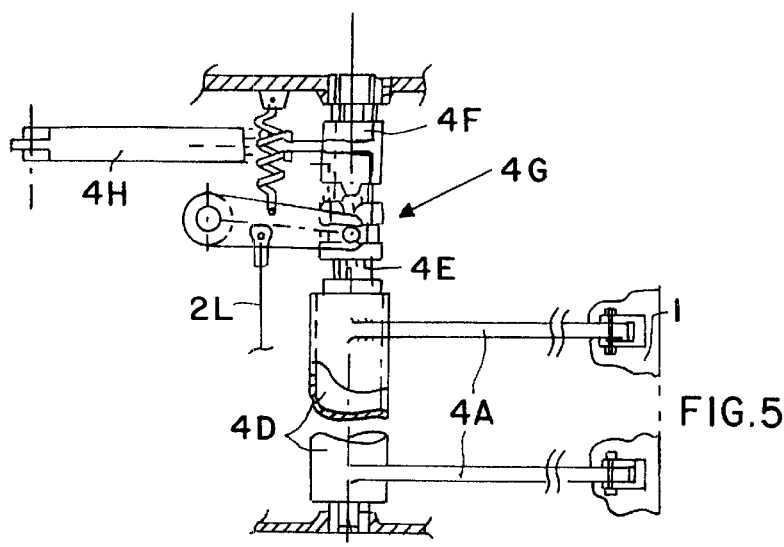
FIG. 5 is a detailed sectional view of a portion of the arrangement shown in FIG. 4, as seen along the section line V—V.

FIGS. 4 and 5 show a second embodiment of a baggage storage system according to the invention, which uses an alternative drive arrangement 10 in comparison to the above described gear belt drive 2. Namely, the present system uses a pivot drive 4, whereby the baggage compartment 1 is tilted and slidingly guided between the upper closed position (shown in dash-dotted lines) and the lower open position (shown in solid lines). The pivot drive 4 includes one or more lever arms 4A that are pivotably connected to appropriate support brackets on the baggage compartment 1, such that the lever arms 4A can lift and move the baggage compartment 1. To appropriately guide the motion of the baggage compartment 1 and achieve the proper open and closed positions thereof, the baggage compartment 1 is further equipped with running rollers 4C that respectively are movably guided along a slotted guide 4B in which the running rollers 4C are received. The guide slot of the slotted guide 4B has a curved shape that provides the proper compound sliding and pivoting motion of the baggage compartment 1 as it moves between the upper and lower positions.

The operating force is applied to the baggage compartment 1 by the one or move lever arms 4A, which are shown in the upper position 4A' by dash-dotted lines. The lever arms 4A are both connected in common (and to each other) by a torsion tube 4D, and are driven in common by a splined shaft 4E via an operating lever 4F that is selectively rotatable or fixable on the splined shaft 4E. The actual motive force or power for lifting and lowering the baggage compartment 1 is provided by a working cylinder 4H, which may be a hydraulic or a pneumatic cylinder, or which may be embodied as an electric motor and spindle, or any other known actuator that provides a linear stroke output to be coupled to the operating lever 4F.

The selective fixing of the lever 4F with respect to the splined shaft 4E is achieved via a coupling 4G, which is normally continuously spring-urged into its coupled condition so as to connect the pivot drive 4 through the operating lever 4F to the lever arms 4A. In the event of a failure of the pivot drive 4, the coupling 4G can be decoupled so as to disengage the operating lever 4F from the lever arms 4A, and thereby to allow the manual operation of the baggage compartment 1. The basic construction and operation of the coupling 4G and the manual operation of the baggage compartment 1 correspond to the description already provided above with reference to the coupling 2H and FIGS. 1 to 3. The present embodiment of the baggage compartment 1 is further equipped with a locking latch arrangement 5, to secure the baggage compartment 1 in its upper position, whereby the construction and operation of the locking latch arrangement 5 corresponds to that described above in connection with FIGS. 1 to 3.

FIG. 6 schematically shows a third embodiment of a drive unit 10 for a baggage storage system according to the invention. This drive unit 10 is realized with a hydraulic or pneumatic working cylinder 6, in which a working piston 6D is hydraulically or pneumatically moved. The piston 6D is connected by a piston rod and any suitable linkage to the baggage compartment 1 so as to raise and lower the baggage compartment 1. A bypass valve 6B is interposed in a bypass line 6C which provides a selective bypass bridge for the hydraulic or pneumatic working fluid between the two working chambers of the cylinder 6 on opposite sides of the piston 6D. The bypass valve 6B can be manually operated either directly or via a tension cable 6A or the like, to selectively close the valve (as shown in FIG. 6) or open the valve (as shown by position 6B' in FIG. 6A).

When the valve is open as shown in FIG. 6A, the cylinder 6 and piston 6D are effectively rendered non-functional and freely movable. This is necessary if the hydraulic or pneumatic drive fails, and the baggage compartment 1 is to be operated manually. With the bypass valve open in position 6B', the hydraulic or pneumatic working fluid can freely flow back and forth between the two opposite working chambers of the cylinder 6, so that the piston 6D does not significantly resist or hinder the manual operation of the baggage compartment 1. The flow-through sectional size of the bypass line 6C and the valve 6B are properly dimensioned, depending on the hydraulic or pneumatic working fluid being used, to provide the desired degree of damping for the manual raising or lowering of the baggage compartment 1.

The operation of the bypass valve 6B, for effectively decoupling the hydraulic or pneumatic drive, essentially corresponds to the manual actuation of the coupling 2H or 4G. Namely, the valve 6B is generally held in a closed position by the force of a return spring, so that the bypass line 6C is closed. If the stroke drive 6 fails, however, then the tension cable 6A is manually pulled to open the valve 6B and allow a fluid flow through the bypass line 6C so that the baggage compartment 1 and therewith the working piston 6D can be manually operated. In this manner, the valve 6B and bypass line 6C form a pneumatic or hydraulic coupling arrangement that selectively decouples the power transmission between the hydraulic drive and the baggage compartment 1. With such a drive arrangement, the baggage compartment 1 may further be equipped with a locking latch arrangement 5 as has been discussed above in connection with other Figures.

Figure 7:
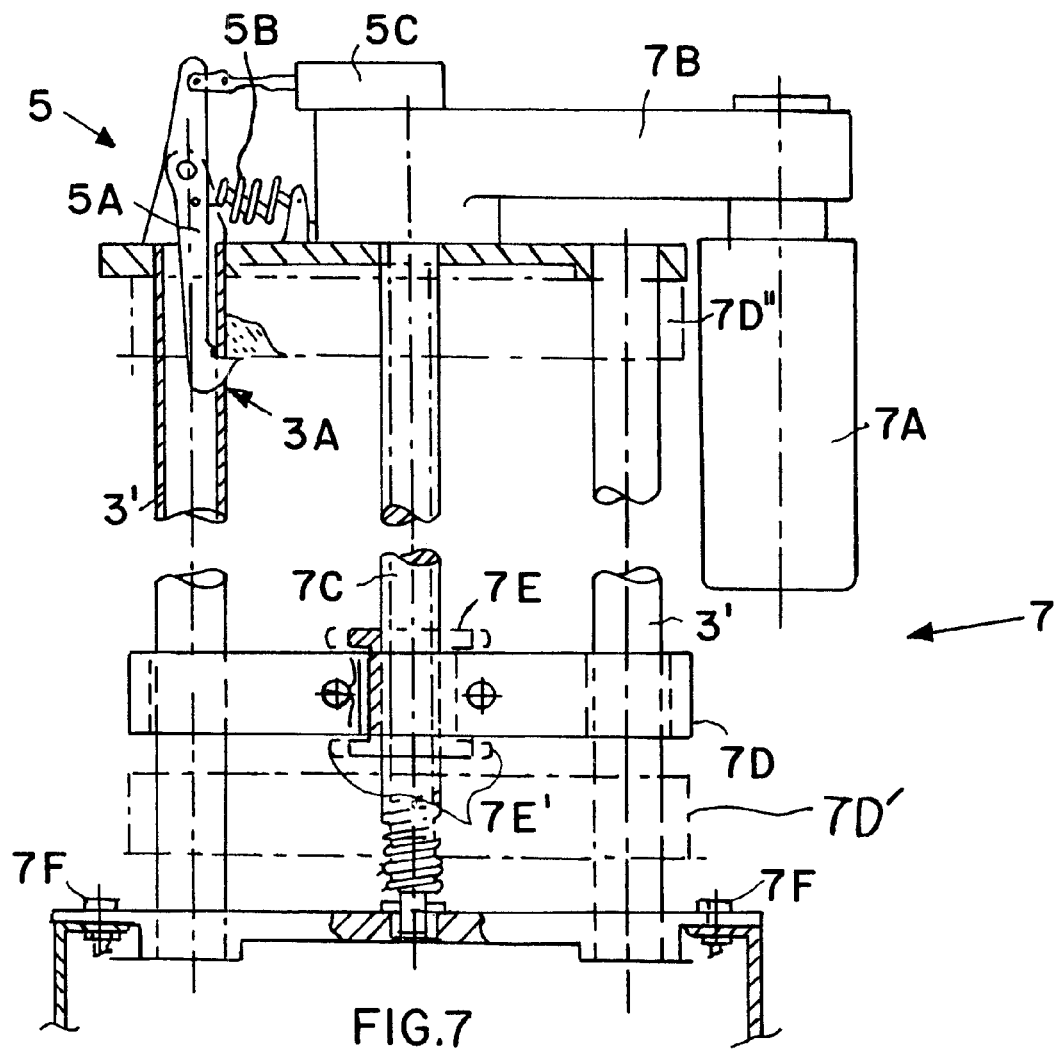
FIG. 7 is a schematic sectional view of a fourth embodiment of a drive unit for operating the lowerable baggage compartment according to the invention.

FIG. 7 shows a further variation of a drive for an inventive baggage storage system. Namely, this fourth embodiment of a drive unit 10 comprises a spindle stroke drive 7 including a drive motor 7A, a spindle transmission 7B, a threaded screw spindle 7C, guide tubes 3', a carriage 7D that guidedly slides along the guide tubes 3', a nut 7E selectively engaged with the spindle 7C, and a locking latch arrangement 5. Throughout this specification, the term "slide"0 and related terms are intended to include direct frictional sliding contact as well as rolling contact between respective components. The baggage compartment 1, which is not shown, is bolted or otherwise connected to the slideable carriage 7D, preferably by means of bolts 7F.

In order to selectively couple or decouple the carriage 7D with respect to the threaded spindle 7C, the drive nut 7E is embodied as a split nut including two nut halves that can be selectively engaged with the spindle (as shown by solid lines in FIG. 7), or disengaged from the spindle in a split or separated position 7E' (shown by dashed lines in FIG. 7). With the drive nut 7E disengaged from the spindle 7C in this manner, the baggage compartment 1 and therewith the slide carriage 7D can be manually moved between the lower position 7D' and the upper position 7D" (shown with dash-dotted lines) without being effectively engaged with the spindle 7C, i.e. without any hindrance of the manual motion by the spindle 7C. On the other hand, when the drive nut 7E is engaged with the spindle 7C in the ordinary condition, the drive motor 7A drives the spindle 7C through the transmission 7B and thereby linearly moves the carriage 7D and therewith the baggage compartment 1 via the thread engagement of the nut 7E. The drive motor 7A can be actuated by appropriate operating switches or the like, and end limit switches that switch off the motor 7A when the carriage has reached the upper or lower positions.

This embodiment of the inventive system may further be equipped with a locking latch arrangement 5, including a latch pawl 5A that protrudes outwardly through a slit 3A in one of the guide tubes 3' so as to engage with and thereby latch the carriage 7D in the upper position 7D". The operation and function of the locking latch arrangement 5 substantially corresponds to that described above in connection with the preceding Figures. For example, a disengagement of the latch pawl 5A can be achieved by a stroke magnet 5C which is actuated by operation of the operating switch. Alternatively, the latch pawl 5A can be disengaged from the carriage 7D by a mechanism such as a tension cable.

The above described embodiments provide examples of various useable drive arrangements or means, coupling arrangements or means, and guide arrangements or means (including e.g. components 1C, 3, 3', 4A, 4B, 4C, 7D) for raising and lowering the baggage compartment of the inventive baggage storage system. Nonetheless, various other drive systems and guidance systems that are conventionally known for raising and lowering a drop-down baggage compartment can be used in the inventive system, in connection with an inventive coupling arrangement to selectively couple or decouple the drive system relative to the baggage compartment. Thereby, the drive can be decoupled from the baggage compartment in an emergency situation, in order to allow the manual operation of the baggage compartment.

The coupling can be embodied in the manner of any conventionally known coupling or clutch arrangement, as a coupling means for selectively providing or interrupting a power-transmitting connection. The coupling means may comprise any of the above described components 2H, 4G, 6B, 6C, or 7E. Alternatively, the coupling means may omit the drive engagement cog of the above described exemplary coupling, but instead may include friction disks that are selectively pressed against each other or a friction band encircling and selectively tightened against a drum. The coupling may further alternatively include two splined shafts arranged axially aligned end-to-end with each other (but not fixed to each other), and a coupling sleeve that is axially slidably arranged in the area of the meeting ends of the two shafts, so that the coupling sleeve may slide into a coupled position in which it overlaps and engages both shafts and into a decoupled position in which it engages only one of the shafts.

The drive arrangement generally includes any suitable power unit such as an electric motor, a piston-cylinder device, or any type of powered actuator, and any suitable drive transmission arrangement, of which the above described belt drive, pivot drive, spindle drive and piston drive are merely examples.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A baggage storage system comprising:
   a baggage compartment that is raisable and lowerable between an upper closed position and a lower open position;
   power drive means for selectively moving said baggage compartment between said upper closed position and said lower open position;
   coupling means for selectively coupling said drive means to said baggage compartment to enable said drive means to selectively move said baggage compartment, and for selectively decoupling said drive means from said baggage compartment to allow said baggage compartment to be selectively moved manually without being coupled with said drive means; and
   guide means for guiding said moving of said baggage compartment between said upper closed position and said lower open position.

2. A baggage storage system comprising:
   a baggage compartment that is raisable and lowerable between an upper closed position and a lower open position;
   a guide arrangement to which said baggage compartment is slidingly connected to allow said baggage compartment to slide guidedly along said guide arrangement between said upper closed position and said lower open position;
   a drive arrangement that includes a power unit and a drive transmission arrangement; and
   a coupling arrangement that is connected to said drive arrangement and that is adapted to be selectively switched to a coupled state to establish a power-transmitting connection from said power unit through said drive transmission arrangement to said baggage compartment so that said drive arrangement can selectively move said baggage compartment between said upper closed position and said lower open position, and to be selectively switched to a decoupled state to interrupt said power-transmitting connection to allow said baggage compartment to be selectively moved manually between said upper closed position and said lower open position without being coupled with said power unit.

3. The baggage storage system according to claim 2, wherein said guide arrangement comprises a linear guide track, and at least one guide roller that is connected to said baggage compartment and that rollingly glides along said guide track.

4. The baggage storage system according to claim 2, wherein said guide arrangement comprises a slotted bracket with a non-linear guide slot therein, and at least one guide roller that is connected to said baggage compartment and that rollingly glides along said guide slot.

5. The baggage storage system according to claim 2, wherein said guide arrangement comprises two guide tubes and a slide carriage arranged slidably on said guide tubes.

6. The baggage storage system according to claim 2, further comprising a locking latch arrangement that selectively engage s said baggage compartment to secure said baggage compartment in said upper closed position.

7. The baggage storage system according to claim 6,
wherein said locking latch arrangement comprises a latch pawl, a pawl operating device connected to said latch pawl, and a detent recess provided in said baggage compartment,
wherein said latch pawl is so arranged to engage into said detent recess when said baggage compartment is in said upper closed position, and
wherein said pawl operating device is adapted to selectively retract said latch pawl out of said detent recess.

8. The baggage storage system according to claim 7, wherein said locking latch arrangement further comprises a spring that biases said latch pawl toward engagement in said detent recess, and wherein said pawl operating device comprises at least one of a magnetic linear stroke actuator and a manually operable tension cable.

9. The baggage storage system according to claim 2,
wherein said power unit comprises an electric motor,
wherein said drive transmission arrangement comprises a drive gear wheel, a toothed gear belt driven by said drive gear wheel, and a drive dog connected to said belt and to said baggage compartment, and
wherein said coupling arrangement comprises a mechanical coupling interposed between said electric motor and said drive gear wheel and adapted to selectively couple and de-couple said drive gear wheel with said electric motor.

10. The baggage storage system according to claim 2,
wherein said power unit comprises a linear actuator,
wherein said drive transmission arrangement comprises a lever arm that is pivotable about a pivot axis and that is pivotably connected to said baggage compartment, and a drive lever that is pivotable about said pivot axis and that is pivotably connected to said linear actuator, and
wherein said coupling arrangement comprises a mechanical coupling interposed between said lever arm and said drive lever and adapted to selectively couple and decouple said drive lever with said lever arm.

11. The baggage storage system according to claim 2, wherein said coupling arrangement comprises a mechanical coupling, a shift claw connected to said mechanical coupling and adapted to shift said mechanical coupling between coupled and de-coupled positions, a manually operable lever, and a tension cable connected to said manually operable lever and said shift claw.

12. The baggage storage system according to claim 2, wherein said coupling arrangement comprises a mechanical coupling, a shift claw connected to said mechanical coupling and adapted to shift said mechanical coupling between coupled and de-coupled positions, and at least one of an electrical actuator, an electromagnetic actuator, a pneumatic actuator and a hydraulic actuator connected to said shift claw and adapted to move said shift claw.

13. A baggage storage system comprising:
a baggage compartment that is raisable and lowerable between an upper closed position and a lower open position;
a guide arrangement to which said baggage compartment is slidingly connected to allow said baggage compartment to slide guidedly along said guide arrangement between said upper closed position and said lower open position;
a drive arrangement that includes a power unit and a drive transmission arrangement, and that is connected to said baggage compartment and adapted to move said baggage compartment between said upper closed position and said lower open position; and
a coupling arrangement connected to said drive arrangement and adapted to selectively establish and interrupt a power-transmitting connection from said power unit through said drive transmission arrangement to said baggage compartment;
wherein said power unit comprises a pneumatic or hydraulic fluid driven piston in a working cylinder, with two working chambers formed on opposite sides of said piston in said working cylinder;
wherein said drive transmission arrangement comprises a piston rod connected to said piston and to said baggage compartment; and
wherein said coupling arrangement comprises a fluid bypass line connected respectively to said two working chambers and a bypass valve interposed in said bypass line, such that opening said valve establishes a fluid bypass through said bypass line between said two working chambers and interrupts said power-transmitting connection.

14. A baggage storage system comprising:
a baggage compartment that is raisable and lowerable between an upper closed position and a lower open position;
a guide arrangement to which said baggage compartment is slidingly connected to allow said baggage compartment to slide guidedly along said guide arrangement between said upper closed position and said lower open position;
a drive arrangement that includes a power unit and a drive transmission arrangement, and that is connected to said baggage compartment and adapted to move said baggage compartment between said upper closed position and said lower open position; and
a coupling arrangement connected to said drive arrangement and adapted to selectively establish and interrupt a power-transmitting connection from said power unit through said drive transmission arrangement to said baggage compartment;
wherein said power unit comprises a drive motor;
wherein said drive transmission arrangement comprises a threaded spindle and a transmission connecting said spindle to said drive motor; and wherein said coupling arrangement comprises a spindle follower that is connected to said baggage compartment and that is selectively engaged and disengaged with said threaded spindle.

15. The baggage storage system according to claim 14, wherein said spindle follower comprises a split nut having two nut portions that can be moved together into engagement with said spindle and separated to be disengaged from said spindle.

16. The baggage storage system according to claim 14, further comprising a slide carriage to which said baggage compartment and said spindle follower are connected, wherein said slide carriage provides the connection of said spindle follower to said baggage compartment.

17. The baggage storage system according to claim 2, wherein said drive transmission arrangement and said coupling arrangement establish said power-transmitting connection as a positive bi-directional constrained power-transmitting connection so that said baggage compartment can only be moved together with a corresponding motion of said power unit when said coupling arrangement is in said coupled state.

* * * * *